United States Patent [19]

Melton

[11] Patent Number: 5,126,091
[45] Date of Patent: Jun. 30, 1992

[54] METHOD FOR MANUFACTURING COMPOSITE MATERIAL

[75] Inventor: Adrian W. Melton, Bristol, England

[73] Assignee: The British Petroleum Company p.l.c., Moorlane, England

[21] Appl. No.: 645,071

[22] Filed: Jan. 22, 1991

Related U.S. Application Data

[60] Division of Ser. No. 494,025, Mar. 15, 1990, abandoned, which is a continuation-in-part of Ser. No. 261,445, Oct. 24, 1988, abandoned.

[30] Foreign Application Priority Data

Oct. 24, 1987 [GB] United Kingdom ............... 8724970

[51] Int. Cl.$^5$ ............................................ B29C 43/18
[52] U.S. Cl. ..................................... 264/257; 264/156
[58] Field of Search ............... 425/411; 264/156, 257, 264/258, 273

[56] References Cited

U.S. PATENT DOCUMENTS

| | | | |
|---|---|---|---|
| 3,264,167 | 8/1966 | Sands | 264/156 |
| 3,787,546 | 1/1974 | Pratt et al. | 264/156 |
| 4,474,720 | 10/1984 | Izard | 264/156 |
| 4,487,372 | 12/1984 | Millard et al. | 264/258 |
| 4,670,205 | 6/1987 | Mortierth | 264/156 |

Primary Examiner—Jay H. Woo
Assistant Examiner—Jeremiah Durkin, II
Attorney, Agent, or Firm—Larry W. G. Evans; Joseph G. Curatolo; Sue E. Phillips

[57] ABSTRACT

A method for manufacturing perforate, fibre-reinforced, composite material, comprising the steps of laying up reinforcing fibres and resin in a mould having needles, the mould including a stripper plate having perforations into which the needles pass when the mould is assembled; curing the resin; and withdrawing the composite from the mould along with the stripper plate.

3 Claims, 4 Drawing Sheets

METHOD FOR MANUFACTURING COMPOSITE MATERIAL

This is a divisional of abandoned application Ser. No. 07/494,025, filed Mar. 15, 1990 which is a continuation-in-part of U.S. Ser. No. 07/261,445 filed Oct. 24, 1988 now abandoned.

FIELD OF THE INVENTION

This invention relates to composite material and in particular relates to a method and apparatus for manufacturing perforate, fibre-reinforced, composite material.

BACKGROUND OF THE INVENTION

Composite materials are known, wherein a fibre reinforcing material is impregnated with a resin which is cured to give a strong, lightweight material. Such materials are particularly suitable for structures where the low weight to strength ratio may be exploited, for example in aircraft structures.

Conventionally, some lightweight structures are made of lightweight metal alloys and in some of these structures one or more sheets of the structure are perforate to provide sound attenuation. Such perforate sheets are found, for example, on the face of blocker doors in jet engines. These perforate metal alloy sheets may be made by known techniques of casting and drilling or punching, and the like. Hitherto, the use of resin-impregnated fibre-reinforced composite materials would not have been thought applicable to the manufacture of such perforate sheets because, drilling or punching fibre-reinforced composite materials would have been expected to break the continuity of the fibres with loss of strength. Furthermore, such additional processing is time consuming.

It has been found that by forming the perforations in the reinforcing fibre material before it is impregnated and cured, by means of needles in a mould, the fibres of the reinforcing fibre material may be parted by the needles rather than being broken, thereby maintaining the continuity of the fibres. It is believed that this results in a composite material with superior qualities.

A problem often associated with the manufacture of composite materials with intricate shapes, such as for example, numerous perforations, is that the material may be difficult to remove from the mould. United Kingdom Patent Application No. GB2090183A, for example, relates to a method of manufacturing a perforate composite material wherein a former is melted to release the composite from the mould. Such a process may be time consuming.

SUMMARY OF THE INVENTION

Thus according to the present invention there is provided a method for manufacturing perforate, fibre-reinforced, composite material the method comprising the steps:
(a) laying up a reinforcing fibre material in one part of a mould capable of receiving reinforcing fibre material and resin to be moulded into a fibre-reinforced, composite material, the mould comprising, a first part having needles, a complementary second part, and a stripper plate having recesses which are capable of engaging with the corresponding needles of the first part of the mould when the mould is assembled,
(b) enclosing the reinforcing fibre material in the mould by assembling the remaining parts of the mould, so that the needles of the first part of the mould engage with the corresponding recesses of the stripper plate and perforate the reinforcing fibre material substantially by parting the fibres of the reinforcing fibre material without breaking the fibres,
(c) impregnating the reinforcing fibre material in the mould with resin, with the needles still engaged with the recesses, and
(d) curing the resin in the mould, whereby the fibre-reinforced composite material tends to withdraw from the mould with the stripper plate rather than with the first part of the mould having needles when the mould parts are disassembled to release the perforate fibre-reinforced composite material. The stripper plate may be integral with the second part of the mould but preferably, the stripper plate is a separate integer.

DESCRIPTION OF THE PREFERRED EMBODIMENT

Preferably, when the mould is assembled with resin impregnated reinforcing fibre therein, the area of contact between the stripper plate and the resin impregnated fibre is greater than the area of contact between the first part of the mould having needles and the resin impregnated fibre. Most preferably, the area of contact with the stripper plate is at least 5% greater than the area of contact with the first part having needles.

Preferably, the reinforcing fibre material is layed-up in the first part of the mould, having the needles.

The fibre material may be, for example, glass-fibre, carbon-fibre, Aramid fibre ® such as Kevlar and the like. Preferably, the reinforcing fibre material is dry but it may be pre-impregnated with resin or other compounds required in the final composite material.

The resin may be any curable resin, for example, epoxy resin, bismaleimide resin, polyester resin, vinyl ester resin, methacrylate resin, acrylate resin, polystyryl pyridine resin, and the like.

The reinforcing fibre material may be suitably impregnated with the resin by injection into the mould by means of positive pressure and/or vacuum.

By curing it is intended to include known curing processes, for example heating in a controlled manner. It is also intended to include part-curing processes wherein the resin is only partly cured prior to removal from the mould; the resultant perforate fibre-reinforced composite material then being further cured.

According to the present invention there is also provided a mould for manufacturing perforate, fibre-reinforced, composite material, the mould being capable of receiving reinforcing fibre material and resin to be moulded into a fibre-reinforced, composite material, the mould comprising, a first part having needles, a complementary second part, and a stripper plate having recesses which are capable of engaging with the corresponding needles in the first part of the mould when the mould is assembled, whereby, on assembly with reinforcing fibre material and resin to form fibre-reinforced composite material, the needles perforate the reinforcing fibre material substantially by parting the fibres of the reinforcing fibre material without breaking the fibres and, on disassembly of the mould after curing, the fibre-reinforced composite material tends to withdraw from the mould with the stripper plate rather than with the first part of the mould having needles.

The stripper plate may be integral with the second part of the mould but preferably, the stripper plate is a separate integer. The stripper plate is perforated, and the mould arranged such that in use each needle of the mould passes into a perforation of the stripper plate without sealing the perforation. During the process of the invention, liquid resin flows around the needles and infiltrates into the perforations of the stripper plate. After the resin has been cured, the perforations of the stripper plate contain plugs of resin. Because these plugs of resin are attached to the fibre-reinforced composite material, the material is lifted out of the mould along with the stripper plate.

In a preferred embodiment of the invention, the perforations in the stripper plate have an area greater at the face of the stripper plate adjacent the second part of the mould than at the face of the stripper plate adjacent the first part of the mould. With such an arrangement, there is no possibility that the plugs of resin present in the stripper plate after curing might slip out of the stripper plate when the stripper plate is lifted away from the first part of the mould.

The stripper plate should be rigid, and may be made of any material sufficiently strong to enable the plate to be removed from the first part of the mould after curing of the resin, along with the composite material. Preferably the plate is made of metal. After curing, it may be removed from the first part of the mould by any suitable means. If may for example be levered out, or pulled out by hooks or ropes fastened to suitable attachment means located on the stripper plate.

The needles may be made of nylon, metal or any suitable material which is capable of withstanding the process conditions. Preferably, the needles are flexible to facilitate alignment with the corresponding recesses. The needles preferably have a rounded or smooth point to prevent damage to the reinforcing fibre material or the mould. The needles have an aspect ratio which is a function of the needle material and the composite material. Buckling of the needles when the mould is assembled is prevented by suitable design taking into account such factors as the stiffness of the needle, the required aspect ratio and the reinforcing fibre material density. Most preferably, the needles are tapered. The needles preferably have only a small clearance fit with the corresponding recesses to facilitate alignment and minimise escape of impregnating resin.

Preferably, in use and when assembled with resin impregnated reinforcing fibre, the area of contact between the stripper plate and the resin impregnated fibre is greater than the area of contact between the first part of the mould having needles and the resin impregnated fibre. In this preferred embodiment when the mould is disassembled, the perforate fibre-reinforced composite material tends to withdraw from the mould with the stripper plate rather than with the first part of the mould having needles. Most preferably the area of contact with the stripper plate is at least 5% greater than the area of contact with the first part having needles.

According to the present invention there is also provided a perforate, fibre-reinforced, composite material whenever manufactured by the method as hereinbefore described.

It is envisaged that the perforate, fibre-reinforced, composite material of this invention may be used in applications requiring lightweight structures of high strength with sound attenuation properties, for example, face sheets of blocker doors. However, numerous other applications will be apparent and these may include, by way of example, sieve trays for distillation columns, sieves, panels for use in aircraft, ships and the like.

The invention will now be described by way of example only and with reference to the accompanying drawings.

Figure 1:
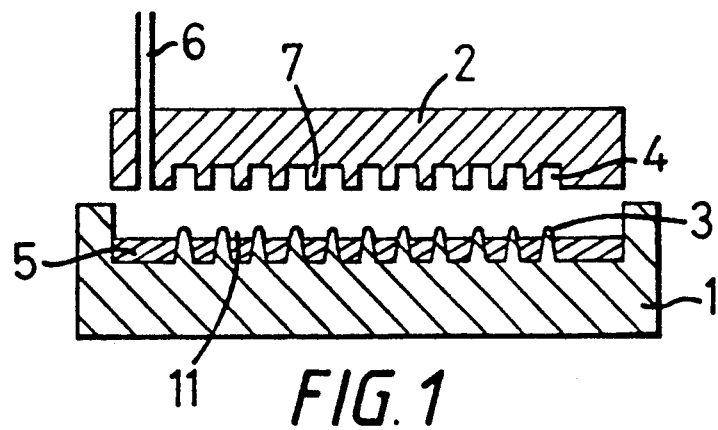
FIG. 1 represents in cross-section a mould for use in the method according to the present invention.
Figure 2:
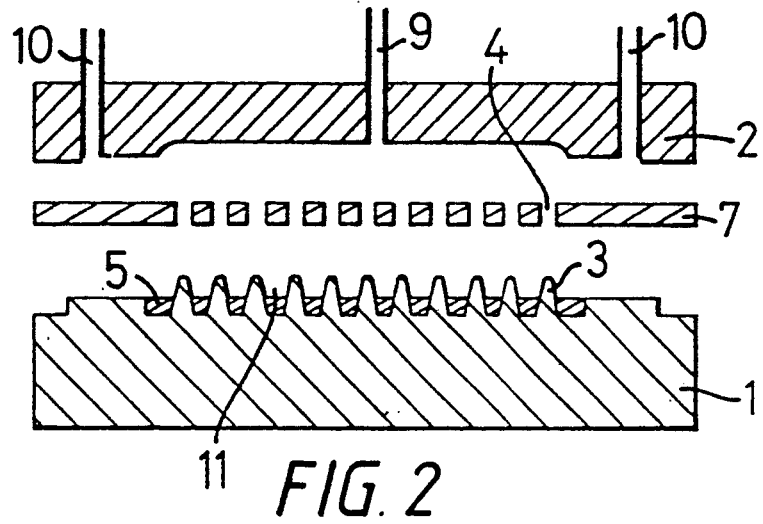
FIG. 2 represents in simplified cross-section a mould for use in the method according to the present invention.
Figure 3:
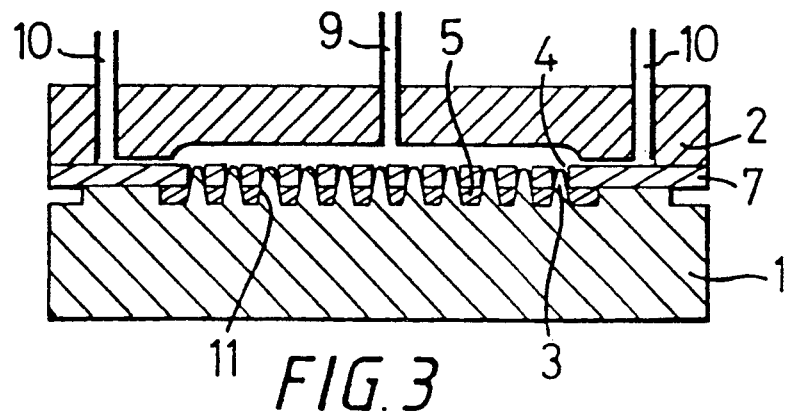
FIG. 3 represents in simplified cross-section the mould as in FIG. 2 assembled.

In FIG. 1, a mould having two parts (1) and (2) is used for making perforate, fibre-reinforced, composite material according to the method of the present invention. The first part (1) of the mould is capable of cooperating with the second part (2) of the mould comprising an integral stripper plate (7). The first part (1) of the mould has needles (3) which engage with corresponding perforations (4) in the stripper plate (7) when it is assembled. A void (11) which has the shape of the perforate, fibre-reinforced, composite material to be formed, is defined between the parts (1) (2) of the mould when they are assembled and the needles (3) are engaged with the perforations (4).

In use, reinforcing fibre material (5) is layed-up in the first part of the mould. The reinforcing fibre material is, for example, glass cloth. The reinforcing fibre material is dry, that is to say it is not impregnated with resin. The mould is then assembled so that the needles (3) engage with the perforations (4) and perforate the reinforcing fibre material without breaking them. The mould void (11) is then filled with an epoxy resin, for example, as supplied by Ciba Geigy with reference MY720/HY906-/DY062, by injection through inlet (6) at pressure (for example up to 400 KN/m$^2$) to impregnate the fibres. The resin is then cured, for example by heating for 0.5 hours at 120° C., then 4 hours at 180° C., before the mould is disassembled to release the perforate, fibre-reinforced, composite material which tends to withdraw from the mould with the stripper plate (7) of the second mould part (2) rather than with the first mould part (1) having needles.

FIGS. 2 to 5 show in simplified views a mould which was used to make a perforated composite material according to the present invention. In particular, FIGS. 2 to 5 have been simplified by showing fewer needles and perforations than were actually used. In FIGS. 2, 3, 4 and 5 a mould having two parts (1) (2) was used for making perforate, fibre-reinforced, composite material according to the method of the present invention. The first part (1) of the mould was capable of cooperating with an aluminium stripper plate (7) and with the complementary second part (2) of the mould. The first part (1) of the mould had steel needles (3) which engaged with corresponding perforations (4) in the stripper plate (7) when the mould was assembled. A void (11) which was the shape of the perforate, fibre-reinforced, composite material to be formed, was defined between the first part (1) and the stripper plate (7) when they were assembled and the needles (3) were engaged with the perforations (4). The second part (2) fitted over the stripper plate and had an inlet (9) through which resin could be introduced and outlets (10) through which a vacuum could be drawn to assist the resin to flow into the mould void (11).

Figure 4:
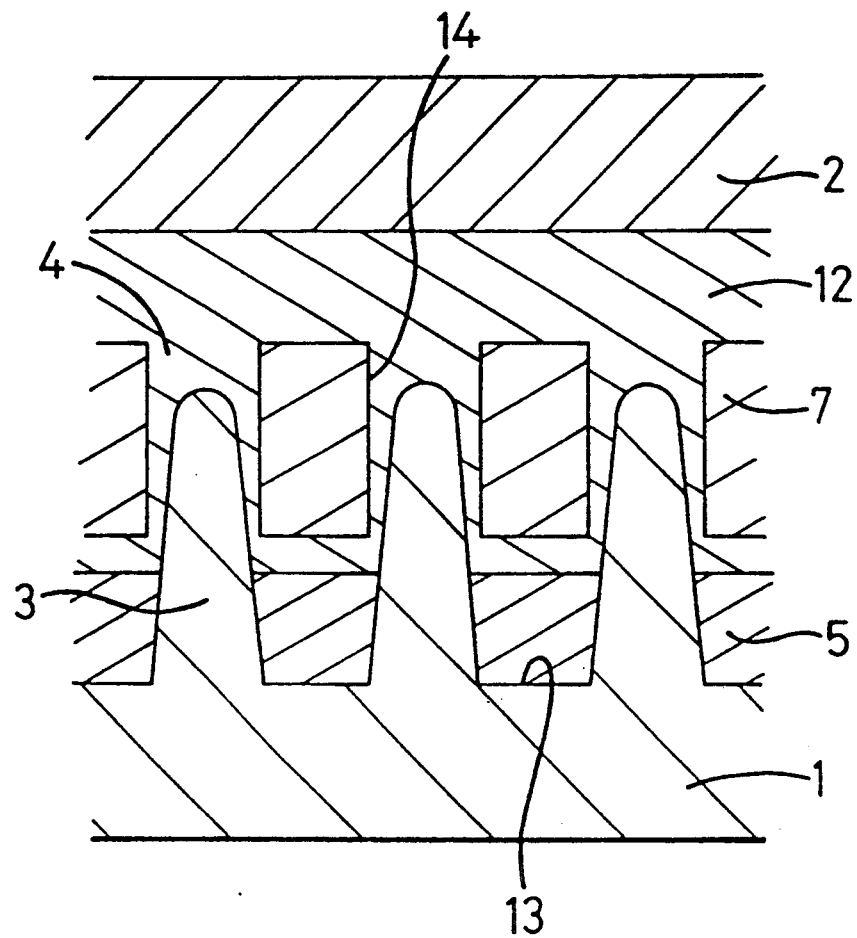
FIG. 4 represents in enlarged cross-section part of a mould as in FIGS. 2 and 3 assembled with reinforcing fibre material and resin.
Figure 5:
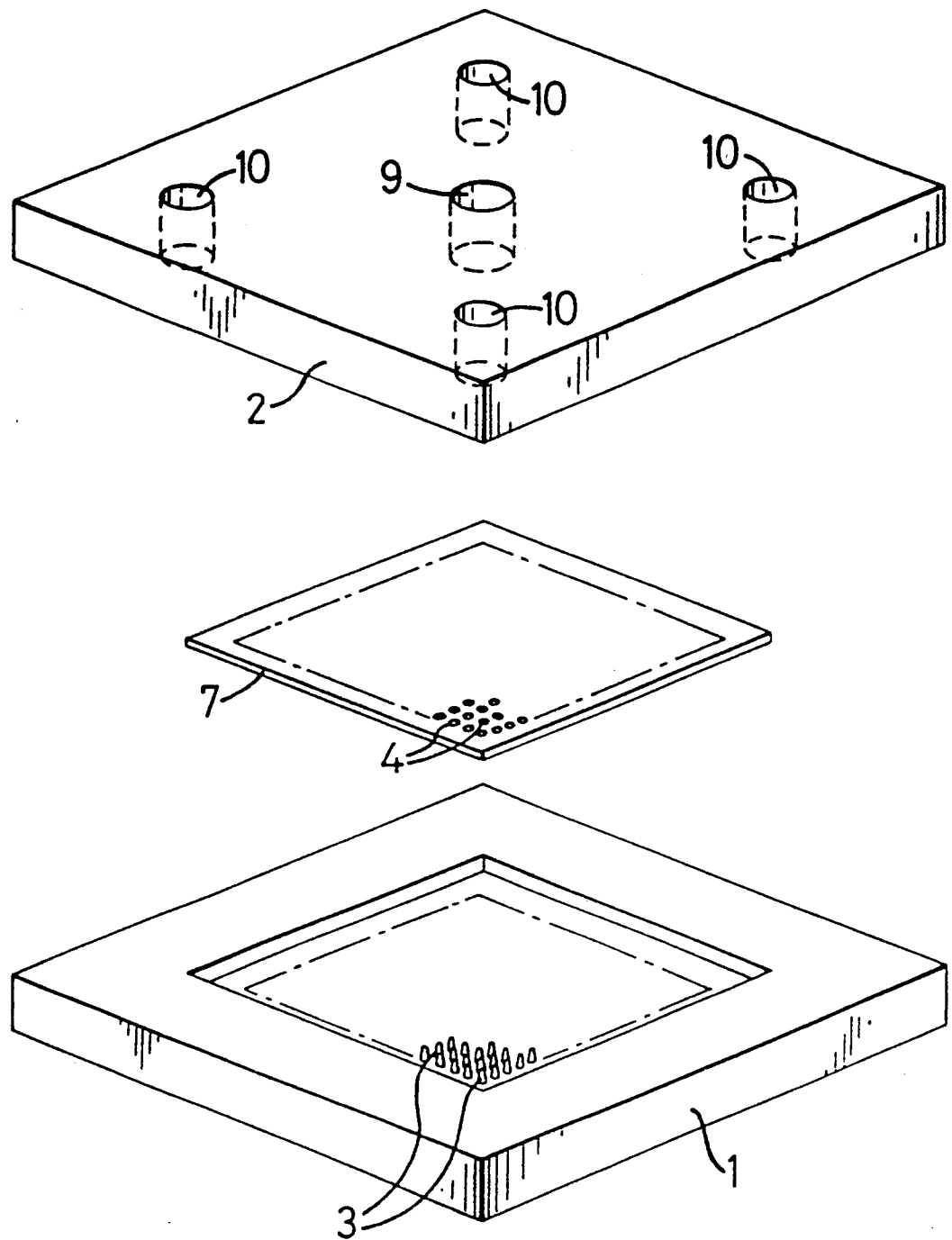
FIG. 5 represents in simplified perspective, a mould according to the present invention as in FIGS. 2 to 4.

In the preferred embodiment shown in enlarged cross-section in FIG. 4, when assembled with reinforcing fibre material (5) and impregnated with resin (12), the area of contact (14) between the stripper plate (7) and the resin impregnated fibre (5,12) was greater than the area of contact (13) between the first part (1) having the needles (3) and the resin impregnated fibre (5,12). The area of contact (14) with the stripper plate (7) was preferably at least 5% greater than the area of contact (13) with the first part (1) having needles (3).

In this example, the needles had a pitch of 0.3175 cm and a diameter tapering from 0.127 cm to 0.122 cm. The corresponding recesses had a clearance of 0.0254 cm with the needles when assembled, that is to say they had a bore of 0.1524 cm. The mould part (1) was 127 mm square and 19 mm high with the needles (3) in a recess 4 mm deep.

In use, reinforcing carbon-fibre cloth (5) was layed-up in the first part of a mould (1) having needles (3). The stripper plate (7) having perforations (4) was assembled with the first part (1) of the mould so that the needles (3) engaged with the perforations (4) and perforated the reinforcing fibre material substantially by parting the fibres of the reinforcing carbon-fibre material without breaking them. The second mould part (2) was positioned over the stripper plate (7) and the mould void (11) was filled with an epoxy resin (supplied by Ciba Geigy reference number MY720/HY906/DY062) at up to 400 KN/m$^2$ pressure through inlet (9). When the mould was full it was cured for 0.5 hours at 120° C. then 4 hours at 180° C. before being disassembled whilst still warm (about 60° C.).

In this example, the area of contact (14) between the stripper plate (7) and the resin impregnated fibre 5,12) was 5%-10% greater than the area of contact (13) between the first part (1) having needles (3) and the resin impregnated fibre (5,12). Therefore, when the second mould part (2) and stripper plate (7) were removed from the mould the fibre-reinforced, composite material stayed attached to the stripper plate (7) and was easily removed from the needles (3). A thin wire was passed across the upper and lower surfaces of the stripper plate to remove the perforate, fibre-reinforced, composite material from the stripper plate and then the face of the composite material that had been in contact with the stripper plate was polished by known techniques.

Figure 6:
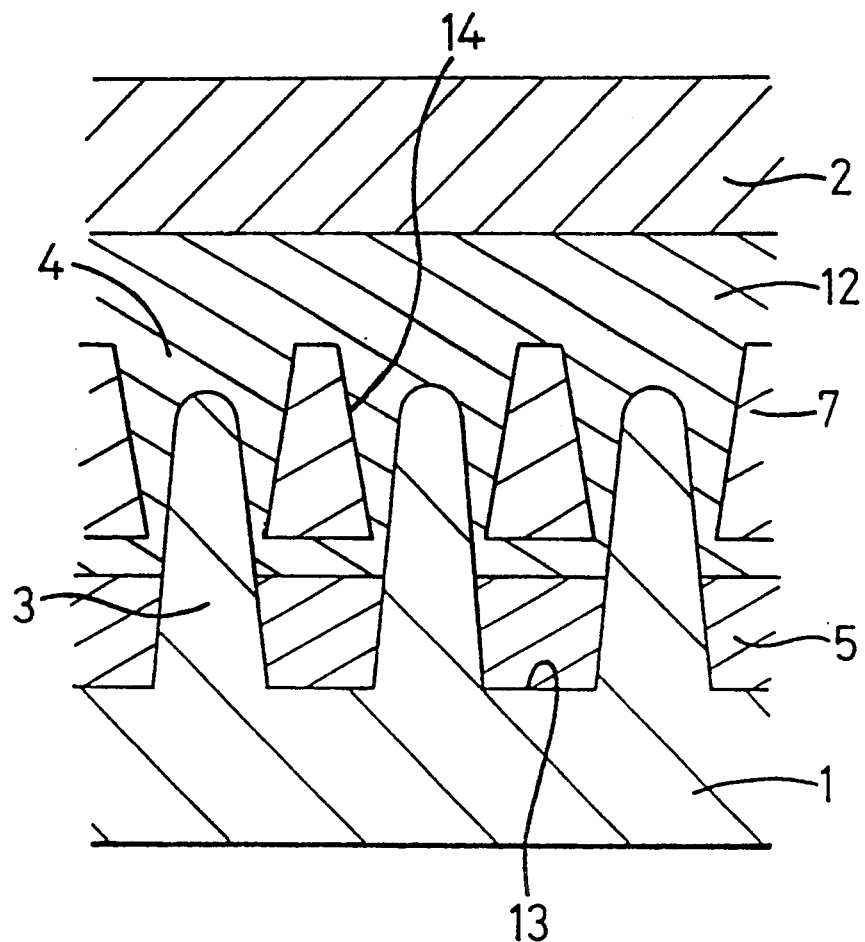
FIG. 6 represents a modified form of the mould of FIG. 4.

FIG. 6 differs from FIG. 4 only in that each of the perforations (4) of the stripper plate (7) is larger at the face adjacent to the second mould part (2) than at the face adjacent to the first part (1).

I claim:

1. A method of manufacturing perforate, fibre-reinforced, composite material, said method comprising the steps:
   (a) laying up a reinforcing fibre material in one part of a mould, said mould being capable of receiving reinforcing fibre material and resin to be moulded into a fibre-reinforced, composite material, said mould comprising:
   a first part having needles,
   a complementary second part, and
   a stripper plate having perforations into which corresponding needles of said first part of the mould are capable of passing when the mould is assembled,
   (b) enclosing said reinforcing fibre material in said mould, by assembling the remaining parts of said mould so that said needles of said first part of said mould pass into said corresponding perforations of said stripper plate, and perforate said reinforcing fibre material substantially by parting the fibres of said reinforcing fibre material without breaking said fibres,
   (c) impregnating said reinforcing fibre material in said mould with resin, with said needles still within said perforations, and
   (d) curing said resin in said mould,
   whereby the perforate, fibre-reinforced composite material withdraws from said mould with said stripper plate rather than with said first part of the mould having needles when said mould parts are disassembled to release the perforate, fibre-reinforced composite material.

2. A method according to claim 1 in which, when the mould is assembled with resin impregnated reinforcing fibre therein, the area of contact between said stripper plate and said resin impregnated fibre is greater than the area of contact between said first part of the mould having needles and said resin impregnated fibre.

3. A method according to claim 2 in which said area of contact with said stripper plate is at least 5% greater than said area of contact with said first part having needles.

* * * * *